April 5, 1927.
J. HUDSON
1,623,922
AIR CIRCULATING SYSTEM FOR CARGO VESSELS
Filed July 1, 1926        2 Sheets-Sheet 1
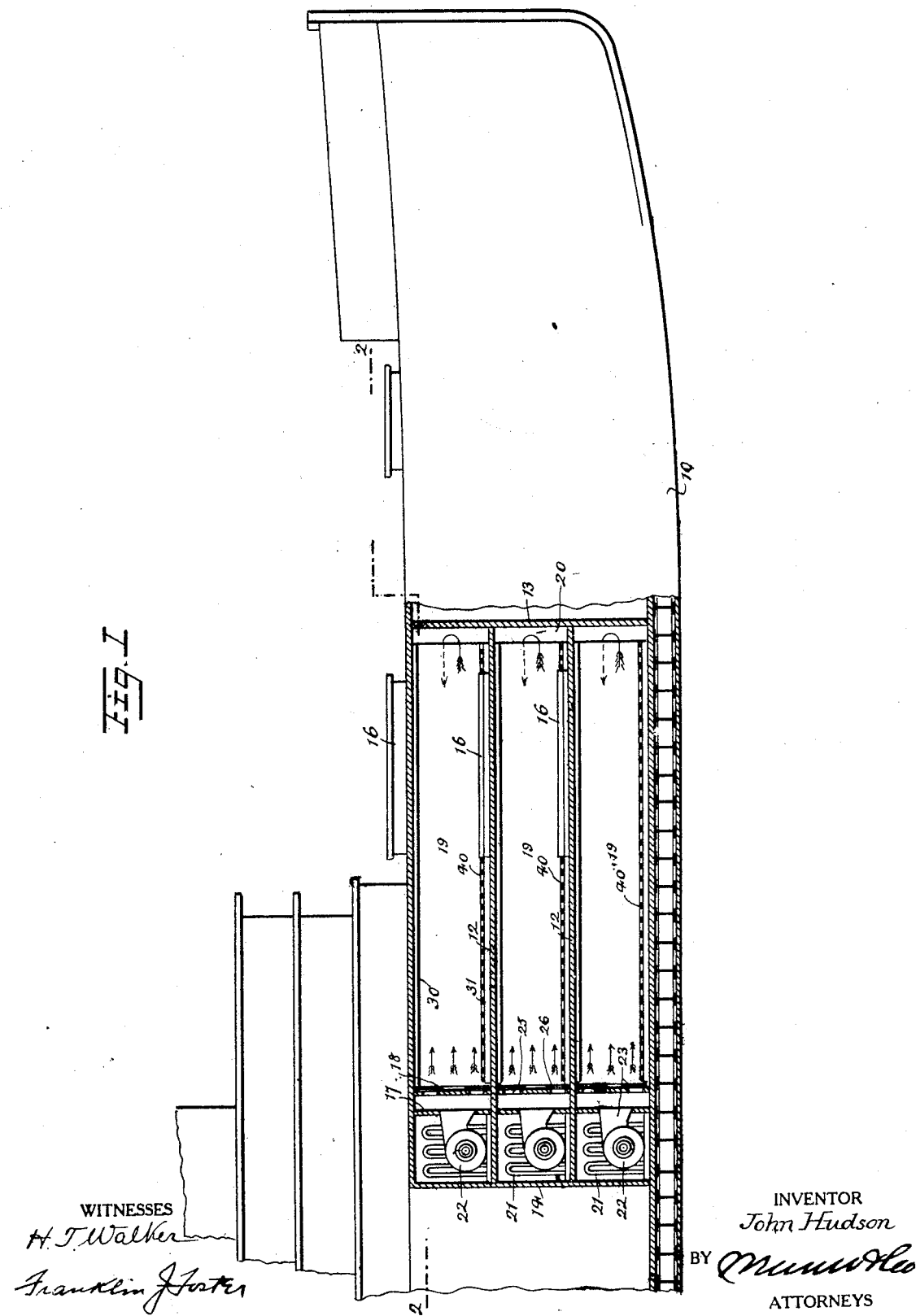
WITNESSES
H. T. Walker
Franklin J. Foster
INVENTOR
John Hudson
BY
ATTORNEYS April 5, 1927. 1,623,922
J. HUDSON
AIR CIRCULATING SYSTEM FOR CARGO VESSELS
Filed July 1, 1926 2 Sheets-Sheet 2
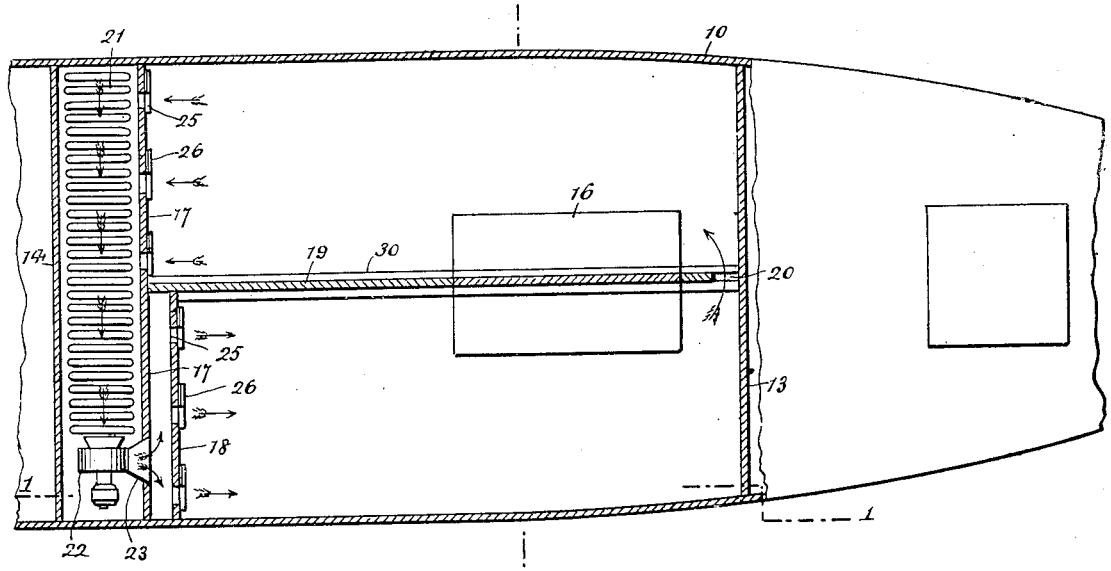
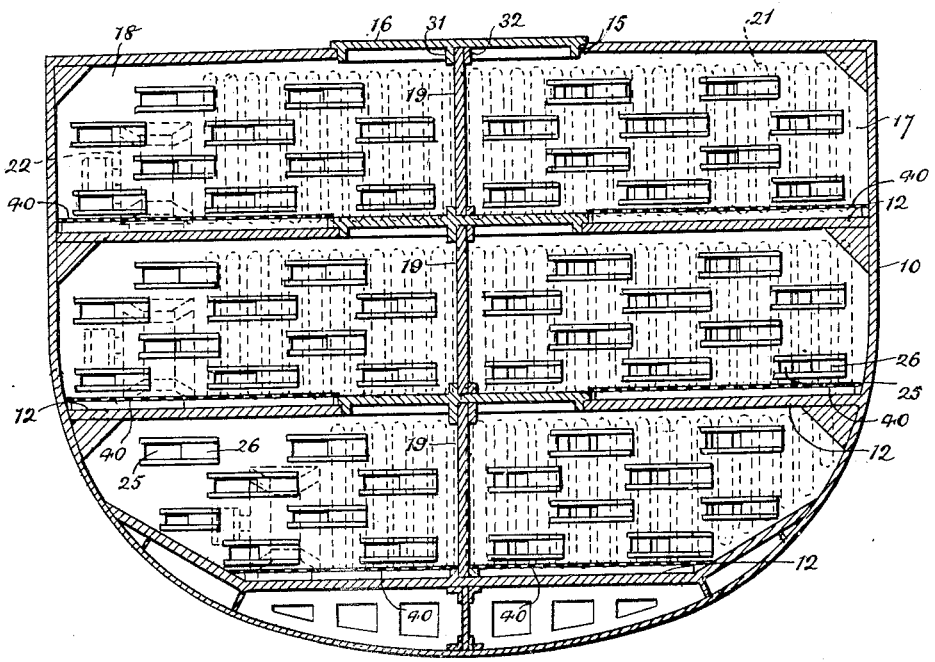
WITNESSES
H. J. Walker
Franklin J. Foster
INVENTOR
John Hudson
BY
ATTORNEYS Patented Apr. 5, 1927.

1,623,922

UNITED STATES PATENT OFFICE.

JOHN HUDSON, OF BROOKLYN, NEW YORK.

AIR-CIRCULATING SYSTEM FOR CARGO VESSELS.

Application filed July 1, 1926. Serial No. 119,925.

The present invention is concerned with the provision of means for circulating air through the cargo compartments of a cargo ship and is concerned primarily with an improvement in the circulating system disclosed in Patent No. 1,491,750, issued to me on April 22nd, 1924.

In the prior patent I provided a system which eliminated the use of air trunks at the sides of the cargo compartments, utilized the entire width of a ship for cargo space, and introduced a fore and aft interdeck circulation which caused air to pass around the cargo stored on the different decks.

This system has proven suitable for certain types of vessels and for other types of vessels in which the entire cargo on two adjacent decks consists of the same material, and requires to be carried at the same temperature. To meet special requirements however, it is found necessary to deal with a single deck space, as for instance in the case of a vessel carrying mixed fruit cargos, such as citrous fruits bananas and pineapples, all of which must be retained at different temperatures. Furthermore, in the case of such cargos, the air circulated in the different compartments must not be allowed to combine, as such an air mixture would give rise to the formation of objectionable gases, and the flavor of the various fruits would be affected. The proposed system is also more readily adaptable to ships where an odd number of deck spaces, instead of an even number are to be dealt with. I also find that many ships carry a mixed cargo, only part of which requires air to be circulated over it. In the event that such a cargo is carried the interdeck circulation is frequently impracticable or unnecessary.

In accordance with the present invention, I have devised an air circulating system which retains all the advantages of the old pantented system, but which makes it possible to set up a circulation of air through a cargo stored only on one deck.

To accomplish this result I preferably divide the cargo space longitudinally by a removable fore and aft partition and a continuous circulation of air is had fore and aft of the ship around this partition, through the two cargo compartments defined by the partition and the sides of the ship.

The use of air trunks is eliminated, the entire width of the vessel is used for storage space, and the air circulation is had only upon certain decks where it is needed, in many cases only upon a single deck.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1 is a view partly in side elevation and partly in longitudinal section through a cargo ship, embodying the present invention;

Figure 2 is a sectional plan view on the staggered line 2—2 of Figure 1, with the deck gratings omitted for the sake of clearness, and Figure 3 is an enlarged transverse view on the line 3—3 of Figure 2.

In the drawings I have used the reference character 10 to designate a cargo ship more or less of conventional structure. The ship is divided into a number of cargo compartments by decks 12 extending fore and aft of the ship. These decks cooperate with a forward bulkhead 13 and an after bulkhead 14 to define the cargo compartments. Alined hatchways 15 in the deck are covered by the hatch covers 16 in the usual manner. Near one end of each compartment, preferably near the after end thereof, I provide a pair of spaced, transversely extending partitions or bulkheads 17 and 18. The bulkhead 17 extends the full width of the ship, while bulkhead 18 extends merely from one side of the ship to a removable, central, longitudinally extending, vertical partition 19 which subdivides the cargo compartment into a pair of storage spaces. Partition 19 terminates just short of the forward bulkhead 13 to provide an opening 20 through which air may circulate from one side of the compartment to the other.

Mounted between the bulkheads 14 and 17 is a temperature regulating apparatus, such for instance as refrigerating coils 21. A blower fan 22 also disposed in this space includes a discharge nozzle 23 discharging into the space between bulkheads 17 and 18. The blower 22 discharges the air along one side of the partition 19, and sucks back along the other side of the same partition and through the refrigerating coils 21. These coils in extremely cold outside temperatures may be used as heating coils instead of refrigerating coils to maintain the cargo compartments at a predetermined temperature regardless of outside weather conditions. To permit this circulation of air, the bulkhead 18 and that portion of the bulkhead 17 not covered by the bulkhead 18 are formed with openings 25 therein covered by sliding dampers or doors 26. As best seen in Figure 2, when the blower is in operation a continuous air circulation is maintained. The direction of the circulation is indicated by the arrows and the temperature of the air which is circulated may be conveniently regulated.

In the event that the ship is provided with several decks as illustrated, each deck may be provided with its own air circulating and temperature regulating apparatus. In the event that certain of the decks are not used for storing perishable goods or cargo which requires air circulation there will be no need for operating the blowers or the coils.

The manner of applying the longitudinally extending partition 19 has been indicated somewhat diagramatically. This partition is built up, preferably, of a number of boards laid either horizontally, vertically or arranged side by side, having their upper and lower ends received in channels 30 secured to the upper and lower side of adjacent decks. The hatch covers 16 may conveniently have one channel section 31 integral therewith and the other channel section 32 removably secured after the boards are in place.

Obviously numerous expedients might be resorted to for properly and quickly erecting the partition 19 during the time or after the time that the cargo is loaded.

I have illustrated in Figs. 1 and 3 the use of the customary wooden gratings 40 spaced a few inches above the decks for supporting the cargo above the deck and permitting air circulation under the grating and cargo. These gratings have been omitted in Fig. 2 for the sake of clearness. It may be noted that the gratings will permit an unimpeded fore and aft air circulation beneath the cargo stored on the various decks.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

What I claim is:

1. A cargo ship including a pair of decks and a pair of bulkheads defining a cargo storage space, a fore and aft vertical partition dividing the storage space into two parts and terminating short of one bulkhead, and means for maintaining a circulation of air around the ends of the partition forwardly through one section of the compartment and aft through the other section thereof.

2. A cargo ship including a pair of decks and a pair of bulkheads defining a cargo storage space extending the full width of the ship, a fore and aft vertical partition dividing the storage space into two parts and terminating short of one bulkhead, and means for maintaining a circulation of air around the ends of the partition forwardly through one section of the compartment and aft through the other section thereof, rails secured to the upper face of one deck and to the lower face of the other deck for removably receiving the partition.

3. A cargo ship including decks extending the full width thereof and bulkheads coacting with two decks to define a cargo compartment extending the full width of the ship, and a fore and aft removable partition in the cargo compartment terminating short of one end thereof, acting to direct an air current circulated fore and aft through said compartment.

4. A cargo ship including a pair of decks and a pair of bulkheads defining a cargo storage space extending the full width of the ship, a fore and aft vertical partition dividing the storage space into two parts and terminating short of one bulkhead, and means for maintaining a circulation of air around the ends of the partition forwardly through one section of the compartment and aft through the other section thereof, and means removably securing the partition in place.

JOHN HUDSON